(12) United States Patent
Biziorek et al.

(10) Patent No.: US 11,096,333 B2
(45) Date of Patent: *Aug. 24, 2021

(54) ROUND BALER INCLUDING ULTRASONIC FILM SENSOR

(71) Applicant: DEERE & COMPANY, Moline, IL (US)

(72) Inventors: Stéphane Biziorek, Gray la Ville (FR); Pascal Gresset, Auxon Dessous (FR); Romain Repecaud, Arc les Gray (FR); Frederic Perrotin, Le Tremblois (FR); Sébastien Guillemot, Pesmes (FR)

(73) Assignee: DEERE & COMPANY, Moline, IL (US)

(*) Notice: Subject to any disclaimer, the term of this patent is extended or adjusted under 35 U.S.C. 154(b) by 177 days.

This patent is subject to a terminal disclaimer.

(21) Appl. No.: 16/451,075

(22) Filed: Jun. 25, 2019

(65) Prior Publication Data

US 2020/0008357 A1   Jan. 9, 2020

(30) Foreign Application Priority Data

Jul. 6, 2018 (DE) .......................... 102018211228.2

(51) Int. Cl.
| | |
|---|---|
| *A01F 15/07* | (2006.01) |
| *B65B 11/58* | (2006.01) |
| *B65B 41/16* | (2006.01) |
| *B65B 57/12* | (2006.01) |
| *B65B 27/12* | (2006.01) |
| *B65B 41/12* | (2006.01) |
| *B65B 57/04* | (2006.01) |

(52) U.S. Cl.
CPC .......... *A01F 15/0715* (2013.01); *B65B 11/58* (2013.01); *B65B 27/125* (2013.01);
(Continued)

(58) Field of Classification Search
CPC ....... B65B 11/025; B65B 11/04; B65B 11/58; B65B 41/16; B65B 57/12; A01F 15/071;
(Continued)

(56) References Cited

U.S. PATENT DOCUMENTS 6,966,162 B2 *  11/2005  Viaud et al. ........ A01F 15/0715
                                                        53/64
7,437,866 B2 *  10/2008  Smith et al. ........ A01F 15/0833
                                                        56/341
(Continued)

FOREIGN PATENT DOCUMENTS

DE         60225537 T2      4/2009
DE   102015008745 A1 *  1/2017  ......... A01F 15/0715
(Continued)

OTHER PUBLICATIONS

German Search Report issued in counterpart application No. 102018211228.2 dated Mar. 11, 2019. (10 pages).

*Primary Examiner* — Stephen F. Gerrity (57) ABSTRACT

The invention relates to a round baler having a bale chamber in which a round bale can be produced, and a wrapping device with which a completely pressed round bale can be wrapped with a first plastic film in the bale chamber, and a feed device for feeding the first plastic film into the bale chamber. The round baler also includes a feed point at which the first plastic film can be fed to the bale chamber, and an ultrasonic sensor which is arranged at the bale chamber. The ultrasonic sensor is arranged at the bale chamber in such a way that with the ultrasonic sensor it is possible to determine whether the first plastic film is present on a surface of the round bale. The invention also relates to a detection method for detecting a first plastic film on a surface of a round bale.

12 Claims, 5 Drawing Sheets

(52) U.S. Cl.
CPC .............. *B65B 41/12* (2013.01); *B65B 41/16* (2013.01); *B65B 57/04* (2013.01); *B65B 57/12* (2013.01); *A01F 2015/076* (2013.01)

(58) Field of Classification Search
CPC .......... A01F 15/0715; A01F 2015/0735; A01F 2015/076
USPC ........... 53/64, 176, 587, 588, 203, 210, 211, 53/389.4
See application file for complete search history.

(56) References Cited

U.S. PATENT DOCUMENTS

| | | | |
|---|---|---|---|
| 8,141,480 B2 * | 3/2012 | Smith | A01F 15/0715 100/88 |
| 8,434,289 B2 * | 5/2013 | Smith et al. | A01F 15/0715 53/505 |
| 8,573,480 B2 * | 11/2013 | Ma et al. | G07D 7/08 235/379 |
| 10,289,696 B2 * | 5/2019 | Derscheid | A01F 15/0715 |
| 2008/0264031 A1 * | 10/2008 | McHale et al. | A01F 15/0715 56/341 |
| 2017/0006779 A1 * | 1/2017 | Keune | A01F 15/0715 |
| 2017/0057680 A1 * | 3/2017 | Schlichting | B65B 41/16 |
| 2020/0008357 A1 * | 1/2020 | Biziorek et al. | A01F 15/0715 |
| 2020/0008358 A1 * | 1/2020 | Lebeau et al. | A01F 15/0715 |

FOREIGN PATENT DOCUMENTS

| | | | | |
|---|---|---|---|---|
| EP | 1461995 | A2 | 9/2004 | |
| EP | 1464216 | A1 * | 10/2004 | ......... A01F 15/0715 |
| EP | 2647281 | A2 * | 10/2013 | ......... A01F 15/0715 |
| WO | 02076184 | A1 | 10/2002 | |

* cited by examiner

ROUND BALER INCLUDING ULTRASONIC FILM SENSOR

CROSS-REFERENCE TO RELATED APPLICATIONS

This application claims priority to and the benefit of German Patent Application No. 102018211228.2, filed on Jul. 6, 2018, the disclosure of which is hereby incorporated by reference.

TECHNICAL FIELD

The disclosure generally relates to a round baler, and more particularly to a detection method for detecting a first plastic film on a surface of a round bale.

BACKGROUND

A round bale is shaped in a bale chamber of a round baler during a pressing process. For this purpose, harvested material lying on the ground, for example straw, grass or cereal, is conveyed from a pick-up device into the bale chamber and is shaped into a round bale by arranged pressing devices. The round baler can comprise a housing in which the bale chamber can be located. The housing can comprise a housing component and/or an ejection flap. The housing can also be arranged on a chassis. The bale chamber can comprise one or more pressing devices which can be distributed, for example, on or at the housing component and/or the ejection flap and/or the periphery of the bale chamber. A rotation-generating or rotation-maintaining engagement effect on a round bale, which is located in the bale chamber, can be generated by the pressing device. Furthermore, the bale chamber can be embodied as a bale chamber which has an invariable size or is fixed, in particular with cylindrically arranged pressing devices, for example pressing rollers or pressing drums. Alternatively, the bale chamber may be embodied as a bale chamber which has a variable size or is variable and has variable pressing devices, for example pressing belts or pressing chains or pressing straps. In the case of a fixed bale chamber, the pressing devices can be arranged as a multiplicity of pressing rollers which run parallel to one another. The rotational axes of the pressing rollers can lie on an arc when the ejection pipe is closed, and at least one of the pressing rollers can be driven. The arrangement of the pressing rollers in the bale chamber can correspond to a cylindrical shape, so that the pressing rollers are arranged cylindrically around the round bale and form a cylindrical circumferential face.

In addition round balers may be equipped with a wrapping device. After the end of a pressing process, that is to say when the round bale has reached the necessary size, the completely pressed round bale is wrapped with a wrapping material, for example net or yarn, with the wrapping device, and will be subsequently ejected in a wrapped form. In a wrapping process which follows the pressing process, the wrapping material, in particular a first plastic film, is fed by the wrapping device into the bale chamber in the direction of the formed round bale, and is carried along by the outside of the round bale. The round baler can comprise a feed device for feeding the wrapping material into the bale chamber and/or a feed point at which the wrapping material can be fed to the bale chamber, and/or the wrapping device. However, the wrapping device can also comprise the feed device and the feed point. The feed device can extend here at least partially along the width of the bale chamber. The feed device, for example an advancing element or an advancing roller, can pull off the wrapping device in a feeding movement from a supply, for example the supply roller, and feed it into the bale chamber at the feed point. A certain prestressing force can be applied to the supply by a pressing element, so that the wrapping material can be wrapped around the round bale with corresponding tensile force. The supply can be mounted on the chassis or on or in the supply space formed by the housing. The wrapping device, in particular the feed device, can also comprise a pressure element or a conducting element which applies or presses the first plastic film against the round bale at the start of the wrapping process, so that the first plastic film can be entrained by said round bale and in this way pulled off from the supply. The wrapping material is guided around the round bale by the rotating round bale and is subsequently disconnected from the round bale by a cutting device before the round bale is ejected or placed on the ground. Furthermore, the wrapping device, in particular the feed device, can also have further transportation or conveying elements for feeding the wrapping material.

EP 1 461 995 A2 discloses a round baler with a wrapping device for wrapping a round bale. The wrapping device has a sensor which determines whether wrapping material is present on the surface of the round bale. A problem on which the invention is based is considered to be the fact that the known round balers, in particular the round baler disclosed in EP 1 461 995 A2, do not detect the wrapping material on a surface of the round bale and does not abort the wrapping process in good time, such that backing up of the wrapping material occurs. In this context, the wrapping material can, for example, wrap around the pressing devices or the feed device. Furthermore, the sensors and methods which are used in the known round balers are not sufficient to detect satisfactory wrapping on the surface of the round bale.

SUMMARY

According to the disclosure, a round baler having a bale chamber in which a round bale can be produced is proposed. The round baler also includes a wrapping device with which a completely pressed round bale can be wrapped or enveloped with a first plastic film in the bale chamber. The round baler also has a feed device for feeding the first plastic film into the bale chamber, and a feed point at which the first plastic film can be fed to the bale chamber. Furthermore, the round baler includes an ultrasonic sensor which is arranged at the bale chamber in such a way, that with the ultrasonic sensor, it is possible to determine, or the ultrasonic sensor determines, whether the first plastic film is present on a surface of the round bale. Specifically, the round baler includes an ultrasonic sensor which is arranged at the pressing space in such a way that the surface of the round bale can be sensed with the ultrasonic sensor, wherein with the ultrasonic sensor it is possible to determine whether the first plastic film is present on the surface of the round bale.

The first plastic film can be a film made of plastic and/or a film which comprises plastic or is coated with plastic. The film can also be a multi-layer composite film made of a combination of different plastics. The mechanical loadability may have been increased by reinforcing with glass fibers or introducing a mesh.

The ultrasonic sensor can be arranged at or in the bale chamber and/or directed into the bale chamber, i.e. the ultrasonic sensor can be arranged in such a way that an emitted ultrasonic wave is directed into the bale chamber, in particular in the direction of the surface of the round bale and/or of the first plastic film. The ultrasonic sensor can be provided, in particular, between or inside the pressing devices and/or adjoining the round bale. Specifically, the ultrasonic sensor can be arranged and/or attached between the pressing devices and a side wall of the bale chamber and/or directly on the side wall. The ultrasonic sensor can, however, also be arranged and/or attached on the wrapping device and/or the feed device and/or the feed point, in particular the ultrasonic sensor can be arranged and/or attached on the pressure element and/or on the conducting element.

The ultrasonic sensor can produce and/or emit an ultrasonic wave, in particular an ultrasonic pulse, and/or receive and/or detect an ultrasonic wave which is reflected by the surface of the round bale and/or of the first plastic film, that is to say an echo of the ultrasonic pulse. The term can be determined or the ultrasonic sensor determines can be understood to mean, in particular, that the ultrasonic sensor emits an ultrasonic wave in the direction of the surface of the round bale and/or in the direction of the first plastic film on the surface of the round bale and receives and/or detects an echo or does not receive or detect an echo, and/or the prediction of an output signal which can signal whether the first plastic film is arranged on the surface of the round bale. The term scannable can be understood to mean, in particular, that the ultrasonic sensor is arranged on the bale chamber in such a way that the surface of the round bale or the first plastic film is accessible to an ultrasonic wave and/or that an echo can be detected with the ultrasonic sensor. The ultrasonic sensor can output digital or analogue output signals here. The ultrasonic sensor can also evaluate the received echo, in particular can produce the amplitude and/or the energy of the echo, and the output signal which represents, in particular, the evaluation of the ultrasonic pulse and/or of the echo.

With the round baler according to the disclosure, it is possible to determine whether the first plastic film is present on a surface of the round bale and/or whether the first plastic film is arranged correctly on the surface of the round bale or whether the wrapping process of the round bale occurs correctly and the first plastic film is not wrapped around components of the round baler or becomes undesirably backed up. If the ultrasonic sensor determines that a first plastic film is not present, even though the wrapping process has been started, the wrapping process can be aborted and further backing up and/or blockage with the first plastic film does not occur. Furthermore, the ultrasonic sensor can also be used for further measurements, for example transit time measurements for detecting the size of the round bale.

In one aspect of the disclsoure, the round baler comprises a bale-wrapping device for wrapping or enveloping the round bale with a second plastic film, wherein the bale-wrapping device adjoins the bale chamber, in particular at an ejection opening, along a longitudinal axis of the round baler. The bale-wrapping device can therefore be arranged downstream of the bale chamber, preferably in a rear region of the round baler. The bale-wrapping device can take over a round bale from the round baler after the conclusion of a pressing process or after the wrapping process and can enclose the pressed round bale with the second plastic film. The second plastic film can be a film made of plastic and/or a film which comprises plastic or is coated with plastic. The second plastic film can also be a multi-layer composite film made of a combination of different plastics. The mechanical loadability may have been increased by reinforcing with glass fibers or introducing a mesh. The bale-wrapping device can be embodied as an additional assembly which is coupled to the round baler, in particular a press/wrapping combination which is referred to as a combination press, or can be connected as integrated assembly to the round baler. The round bale can therefore advantageously be wrapped with two plastic films, in particular two plastic films which are different from one another. Since both wrapping materials are made of plastic, complex disconnection of the wrapping materials during unpacking can be avoided.

In one aspect of the disclsoure, the ultrasonic sensor is arranged perpendicularly with respect to the surface of the round bale and/or with respect to the first plastic film and is configured in such a way that the ultrasonic sensor emits an ultrasonic pulse and receives an echo if the first plastic film is present on the surface of the round bale. The term "perpendicular with respect to the surface" can be understood as meaning that the surface normal and the direction in which the ultrasonic sensor is oriented in order to determine the first plastic film enclose a detection angle $\alpha$ of $0 \le \alpha \le 10$ degrees, preferably of $0 \le \alpha \le 5$ degrees, specifically $0 \le \alpha \le 2$ degrees. In this first mode for determining the first plastic film the following applies: if there is no first plastic film present on the surface of the round bale and if the ultrasonic sensor is arranged in the region of the detection angle, the ultrasonic wave and/or the ultrasonic pulse which are emitted by the ultrasonic sensor are partially or completely absorbed by the round bale and the ultrasonic sensor does not receive an echo. If, on the other hand, a first plastic film is present on the surface of the round bale and if the ultrasonic sensor is arranged in the region of the detection angle, the ultrasonic wave or the ultrasonic pulse which is emitted by the ultrasonic sensor is partially or completely reflected by the round bale, in particular the first plastic film, and the ultrasonic sensor receives an echo. The ultrasonic sensor can therefore generate an output signal if an echo is received, since the first plastic film is then present on the surface. The measure has the advantage that with the ultrasonic sensor it can be determined very precisely whether the first plastic film is satisfactorily present or arranged on the surface of the round bale. In contrast to known devices and methods, for example for detecting net or yarn, the round baler according to the invention it is possible to determine the first plastic film on a surface of a round bale in a simple fashion by means of a technically and/or structurally simple device.

In one aspect of the disclosure, the ultrasonic sensor is arranged and configured in such a way that the ultrasonic sensor encloses an orientation angle with the surface normal of the surface of the round bale and/or the first plastic film and does not receive an echo of the ultrasonic pulse if the first plastic film is present on the surface of the round bale. The surface normal and the ultrasonic sensor, in particular the direction in which the ultrasonic sensor is oriented, can enclose an orientation angle $\beta$ of $10 \le \beta \le 85$ degrees, preferably of $20 \le \beta \le 60$ degrees, specifically of $30 \le \beta \le 50$ degrees. In this second mode for determining the first plastic film the following applies: if there is no first plastic film present on the surface of the round bale and if the ultrasonic sensor is arranged in the region of the orientation angle, the ultrasonic wave or the ultrasonic pulse which is emitted by the ultrasonic sensor is partially or completely reflected by the round bale in the direction of the ultrasonic sensor, and the ultrasonic sensor does not receive an echo. If, on the other hand, a first plastic film is present on the surface of the round bale and if the ultrasonic sensor is arranged in the region of the orientation angle, the ultrasonic wave or the ultrasonic pulse which is emitted by the ultrasonic sensor is partially or completely reflected away or scattered away from the ultrasonic sensor by the round bale, in particular by the first plastic film, and the ultrasonic sensor does not receive an echo. The ultrasonic sensor can therefore produce an output signal if an echo is not received, since it is then present on the surface of the first plastic film. The measure has the advantage that with the ultrasonic sensor it is possible to determine very precisely whether the first plastic film is satisfactorily present or arranged on the surface of the round bale. In contrast to known devices and methods, for example for detecting net or yarn, with the round baler according to this disclosure, the first plastic film can easily be determined on a surface of the round bale by means of a technically and/or structurally simple device.

In one aspect of the disclosure, the ultrasonic sensor is arranged downstream of the feed point and/or upstream of the feed point. If the ultrasonic sensor is provided downstream of the feed point, even shortly after the start of the wrapping phase it is possible to detect whether the wrapping process is running correctly and the round bale is enclosed by the first plastic film. Downstream of the feed point is understood as meaning that the ultrasonic sensor is arranged after the point at which the first plastic film arrives at the round bale. However, the ultrasonic sensor can also be provided upstream of the feed point, wherein the term "upstream" is to be understood as meaning that the ultrasonic sensor is arranged before the feed point with respect to the rotational direction of the round bale. If the ultrasonic sensor is provided here, it can determine whether a first position of the first plastic film has been placed around the round bale. If this is the case, there is only a small risk of the first plastic film being conducted incorrectly or becoming entangled etc., during a further enclosure process.

In one aspect of the disclosure, two or more ultrasonic sensors are provided. Two to six ultrasonic sensors can preferably be provided, specifically two or three or four or five or six ultrasonic sensors can be arranged on or in the bale chamber and/or directed into the bale chamber. The ultrasonic sensors can also be arranged and/or attached on the round baler, in particular on the wrapping device and/or on the feed device and/or at the feed point, in particular the ultrasonic sensors can be arranged and/or attached on the pressure element and/or on the conducting element. The ultrasonic sensors can be arranged one next to the other or adjacently and/or in a row. Likewise, ultrasonic sensors can extend along the width of the bale chamber and/or be aligned with the peripheral face of the round bale and/or with the base face of the round bale. If two or more ultrasonic sensors are present it is also possible for the first and second modes to be used in combination so that it is possible to more precisely and better detect whether the first plastic film has been correctly applied to the round bale. If two or more ultrasonic sensors are present, it is advantageously possible to determine simultaneously at a plurality of locations on the round bale whether the first plastic film is arranged correctly on the surface of the round bale. Furthermore, the round baler does not have much susceptibility to the failure of one of the ultrasonic sensors, since the remaining ultrasonic sensors are sufficient to detect whether the first plastic film is arranged correctly on the surface of the round bale. Specifically, a first ultrasonic sensor can be arranged downstream, and a second ultrasonic sensor upstream, of the feed point. If an ultrasonic sensor is provided both downstream and upstream of the envelope feed point, the abovementioned disadvantages can be combined and it can be detected both whether the wrapping process has started correctly and whether the first plastic film has been applied to the round bale.

In one aspect of the disclosure, feeding of the first plastic film and/or rotation of the round bale can be adjusted as a function of an output signal of the ultrasonic sensor. Furthermore, the round baler comprises a control unit, and the ultrasonic sensor is connected in a signal-transmitting fashion to the control unit. The term can be adjusted or adjust can be understood here as meaning open-loop and/or closed-loop control and/or the adjustment of a component of the round baler by means of the actuating device and/or the actuator. The ultrasonic sensor can therefore interact with the preferably electrical or electronic control unit (ECU) or electronic control module (ECM), which can be an electronic module and/or an embedded system, in particular adjustable with the control unit. Control units may already be provided on round balers or on vehicles, by which round balers are towed, for example in order to adjust the round baler and/or adjust further functions of the round baler. Specifically, the control unit is also configured in such a way that the detection method described above can be executed with the round baler. The ultrasonic sensor can therefore send the output signal to the control unit and/or receive a setpoint value from the control unit and/or be adjusted by means of the control unit.

Subsequently, the output signal of the ultrasonic sensor can be received and/or processed by means of the control unit, in particular in the case of a malfunction the wrapping process can be automatically aborted by means of the control unit. In this context, the output signal can be an actual value which has been detected with the ultrasonic sensor and can be compared with a setpoint value by means of the control unit. Likewise, by means of the control unit it is possible to adjust the setpoint value at the ultrasonic sensor and compare it with the setpoint value by means of the ultrasonic sensor. The control unit can also be additionally connected in a signal-transmitting fashion to one or more actuating devices and/or actuators of the round baler, so that the actuating device and/or the actuator can be adjusted with the control unit, the latter can be adjusted, in particular, by means of a control signal which the control unit sends to the actuating device and/or the actuator. The control unit and/or the ultrasonic sensor and/or the actuating device and/or the actuator can be connected to one another by means of a cable or wire or else in a wireless fashion, that is to say for example by means of a radio, wherein the communication bus can be an isobus, CAN bus or the like. The control unit also permits a time component to be included, for example in such a way that the output signal is determined after a predetermined time interval after the start of the wrapping process. The time interval is to be selected here in such a way that given such a correct function it can be expected that the first plastic film is applied at the point on the round bale under consideration. In this context, the speed of rotation or the rotational speed of the round bale can also be taken into account.

Depending on the output signal which is supplied by the ultrasonic sensor it is possible for the round baler, in particular the actuating device and/or the actuator, to be adjusted or to be adjustable by means of the control unit so that rotation of the round bale and/or feeding of the first plastic film to the round bale are adjusted. Specifically, in the event of it having been determined that the wrapping process is not being carried out correctly, the rotation of the round bale and/or the feeding of the first plastic film to the round bale is stopped and/or no further first plastic film is pulled off from the supply. The actuating device and/or the actuator can be provided on the round baler, in particular on the wrapping device and/or the feed device. The output signal can, for example, also activate a display or a visual and/or acoustic warning indication which indicates a malfunction of the wrapping function to an operator, so that said operator can interrupt the wrapping phase.

Therefore, incorrect wrapping of the round bale can be detected and interrupted in good time. The operator control of the round baler is simplified by this means, and the interruption time owing to incorrect wrapping is shortened.

In one aspect of the disclosure, the surface is at least one peripheral face of the round bale. The ultrasonic sensor can therefore be directed onto the peripheral face of the round bale. However, an ultrasonic sensor can also be provided which determines whether the side faces of the round bale are also covered with the first plastic film. Furthermore, an ultrasonic sensor can be provided which is directed onto an edge region of the round bale, and it can be determined, for example, whether the first plastic film lies over a corresponding edge of the round bale.

In one aspect of the disclsoure, the first and second plastic films can be different from one another, in particular, the first plastic film can have a smaller elasticity modulus than the second plastic film. The first plastic film which holds the round bale together is therefore more stable than the second plastic film which protects the round bale against environmental influences.

The disclosure also relates to a detection method for detecting a first plastic film, in particular also the second plastic film, on a surface of a round bale. The detection method includes a round baler with a bale chamber in which a round bale is produced, and a wrapping device with which a completely pressed round bale is wrapped with the first plastic film in the bale chamber, and a feed device with which the first plastic film is fed into the bale chamber at a feed point. Subsequently, the round baler comprises an ultrasonic sensor which is arranged at the bale chamber in such a way that with the ultrasonic sensor it is determined whether the first plastic film is present on the surface of the round bale.

In the text which follows, further advantages and advantageous developments and refinements of the disclsoure are explained in more detail both in a design aspect and in a technical method aspect on the basis of exemplary embodiments and with reference to the drawing. In this context, components which correspond or are comparable in their function are characterized by the same reference symbols. In the schematic drawings:

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "substantially" or "approximately" are understood by those of ordinary skill to refer to reasonable ranges outside of the given value, for example, general tolerances associated with manufacturing, assembly, and use of the described embodiments.

Figure 1:
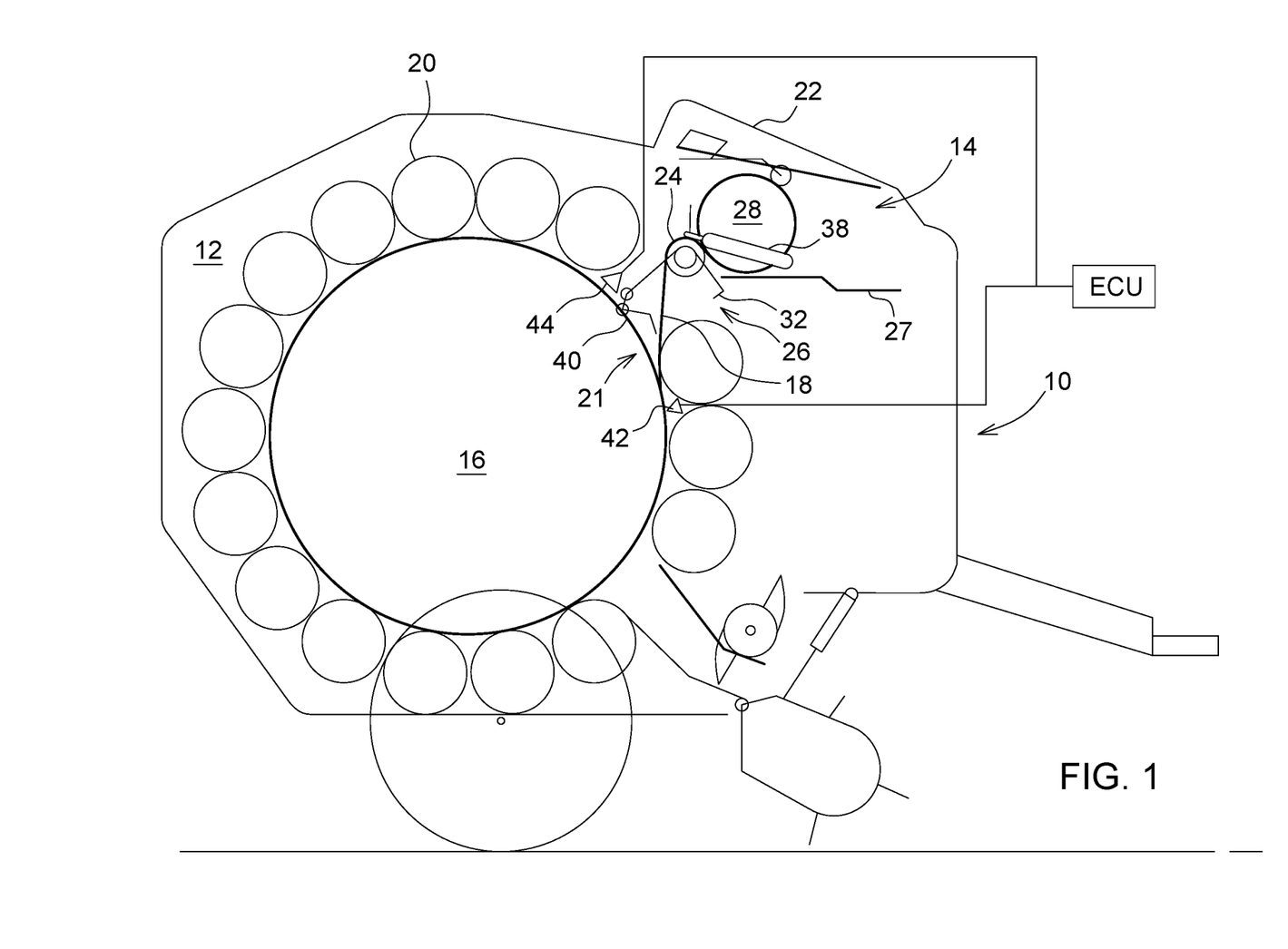
FIG. 1 is a schematic side view showing a first exemplary embodiment of a round baler according to the disclosure.

FIG. 1 shows a first exemplary embodiment of a round baler 10 according to the disclsoure with a bale chamber 12 in which a round bale 16 can be produced, and a wrapping device 14 with which a round bale 16 which is formed in the bale chamber 12 can be wrapped with a first plastic film 18. The round baler 10 can be of a known design, i.e. with a bale chamber 12 which has a constant or variable size and which is surrounded exclusively or in combination by pressing means, for example belts, chains, or as in the exemplary embodiment, by pressing rollers or pressing drums 20. Such a round baler 10 can be used in agriculture to form round bales 16 made of harvested materials such as e.g. straw, hay or grass. However, a use in industrial areas is also conceivable.

In the present embodiment, the wrapping device 14 is provided on the front side of the round baler 10, but can also be arranged in a central region of the round baler 10 or else in front of or above the bale chamber 12. The round baler 10, in particular the wrapping device 14, has a feed device 24 for feeding the first plastic film 18 into the bale chamber 12, and a feed point 21 at which the first plastic film 18 can be fed to the bale chamber 12. The first plastic film 18 is fed through a gap between two adjacent pressing rollers 20, that is to say the feed point 21, to the bale chamber 12, where it is entrained by the round bale 16 which is set in rotation. The round bale 16 is bound by means of the first plastic film 18 and prevented from falling apart after it exits the round baler 10. The wrapping device 14 also comprises a housing 22 and an advancing element which is embodied, for example, as an advancing roller, and a separating device 26. The housing 22 contains a compartment floor 27 on which the first plastic film 18 is mounted as a supply roller 28. The compartment floor 27 can also be embodied in such a way that it supplies a plurality of supply rollers 28 and/or steps or rollers for the position or securing thereof.

The advancing element and/or the feed device 24 are provided on their peripheral face with a lining with a high coefficient of friction and can be set in rotation. The rotation helps initially to pull the first plastic film 18 from the supply roller 28, and to build up a stress therein owing to a braked rotational motion during the wrapping process. The supply roller 28 is located above the support plane of the compartment floor 27, and in its operating position said supply roller 28 comes to bear with an area which corresponds to approximately a 6 to 9 o'clock position on the feed device 24. The first plastic film 18 is pulled off from the supply roller 28 by the feed device 24 and is fed into the bale chamber 12 through the feed point 21 between the adjacent pressing rollers 20. Given correct operation, the first plastic film 18 is caught by the rotating round bale 16 and envelops it. The separating device 26 has a blade 32 which is pivotably attached in order to enter into the path of the first plastic film 18 and cut through it or cause it to tear off when the wrapping process is concluded. Pivoting of the blade 32 occurs by means of an actuating device, a hydraulic motor 38, which is activated by means of a control unit ECU. Furthermore, in the present example embodiment, a conducting device or conducting element 40 which causes the first plastic film 18 to move up against the round bale 16 is pivotably provided.

Furthermore, an ultrasonic sensor 44 is provided adjoining the round bale 16 in the region between the pressing rollers 20 on or in the bale chamber 12. The ultrasonic sensor 44 is arranged upstream of the envelope path feed point 21 and/or in a region lying behind the envelope path feed. The ultrasonic sensor 44 determines whether the round bale 16 is wrapped with the first film 18 at the respective point or whether, for example owing to a malfunction or a lack of a first plastic film 18, no wrapping of the round bale 16 with the first plastic film 18 has occurred on the supply roller 28.

The round baler 10 comprises the control unit ECU and the ultrasonic sensor 44 is connected in a signal-transmitting fashion to the control unit ECU. The ultrasonic sensor 44 can transmit to the control unit ECU an output signal which can be processed by it, so that the process of wrapping the round bale 16 with the first plastic film 18 can be open-loop and/or closed-loop controlled with the control unit ECU. Furthermore, a further or second ultrasonic sensor 42 is also provided in the bale chamber, which sensor 42 can be provided downstream of the location of the feed point 21, for example in the region of the material supply. The second ultrasonic sensor 42 can also have a signal-conducting connection to the control unit ECU.

In the text which follows, more details will be given on the method of functioning of the round baler. If the formation of the round bale 16 in the bale chamber 12 is concluded, which is determined in a known fashion by a sensor (not illustrated) which determines the thickness of the round bale 16 in, for example, a mechanical or optical fashion, the wrapping device 14 is activated. This takes place in that the hydraulic motor 38 is moved, with actuation by the open-loop or closed-loop control device ECU, into its retracted position (illustrated in the figure). In this position, the feed device 24 is set in rotation. The feed device 24 then pulls the first plastic film 18 off the supply roller 28. The first plastic film 18 passes between the pressing rollers 20 up against the round bale 16, wherein it is assisted here by the conducting device 40. Given correct functioning of the wrapping device 14, the first plastic film 18 is caught by the round bale 16 and entrained, as a result of which the rotation of the round bale 16 causes it to be automatically wrapped with the first plastic film 18.

With the ultrasonic sensor 44 it is possible to determine whether the round bale 16 has been completely wrapped with a first layer of the first plastic film 18. If this is the case, the wrapping process is continued. The end of the process is then determined in a customary way, for example after a predetermined time period or by determining a predefined length of the first plastic film 18. In this context it can be provided that the length of the first plastic film 18 is determined by the ultrasonic sensor 44, as has been described above, or else that a further sensor etc. is provided which picks up, for example, the rotational speed of the round baler or of the supply. If it is detected by the ultrasonic sensor 44 that the first plastic film 18 is not present on the round bale 16, a corresponding output signal is transmitted to the control unit ECU. The latter can then abort the wrapping process and can bring about, for example, a situation in which the round bale 16 no longer rotates or a situation in which no further first plastic film 18 is pulled off the supply roller 28 by the feed device 24. The second ultrasonic sensor 42 is arranged upstream of the feed point 21 and can determine whether the first plastic film 18 is present on the round bale 16 and whether the wrapping process is running correctly. If the second ultrasonic sensor 42 detects that there is no first plastic film 18 present on the round bale 16, the second ultrasonic sensor 42 also supplies a corresponding output signal to the control unit ECU, which proceeds in accordance with an output signal of the ultrasonic sensor 44. After correct conclusion of the wrapping process, the first plastic film 18 is cut by the separating device 26, and the wrapped round bale 16 can be ejected in a customary way from the bale chamber 12 of the round baler 10.

Figure 2:
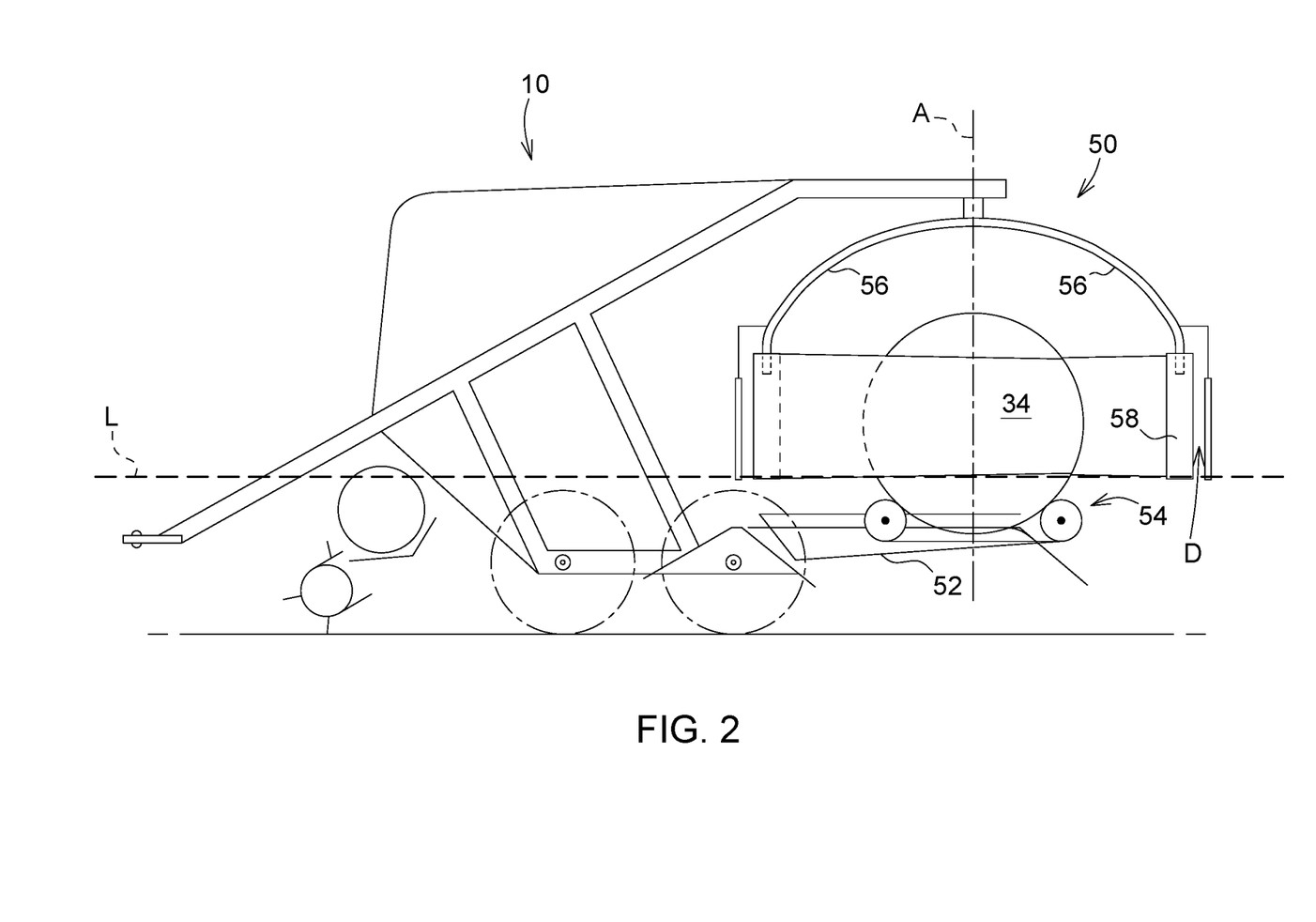
FIG. 2 is a schematic side view showing a second exemplary embodiment of the round baler according to the disclosure.

FIG. 2 shows a schematic illustration of a second exemplary embodiment of a round baler 10 according to the disclosure. The round baler 10 shown in FIG. 2 corresponds essentially to the round baler 10 shown in FIG. 1, so that in the text which follows details are given only on the differences. The bale-wrapping device 54 for wrapping the round bale 16 with a second plastic film 58 has a frame 52, a wrapping table and a pick-up device 54 for picking up the round bale 16 which is to be wrapped, as well as wrapping arms 56 which can be set in motion about an axis A in order to wrap the round bale 16 with a second plastic film 58, for example film made of plastic, by means of a suitable drive (not shown). The bale-wrapping device 54 adjoins an ejection opening on the bale chamber 12 along a longitudinal axis L of the round baler 10, and is arranged downstream of the bale chamber 12, preferably in a region at the rear.

Figure 3A:
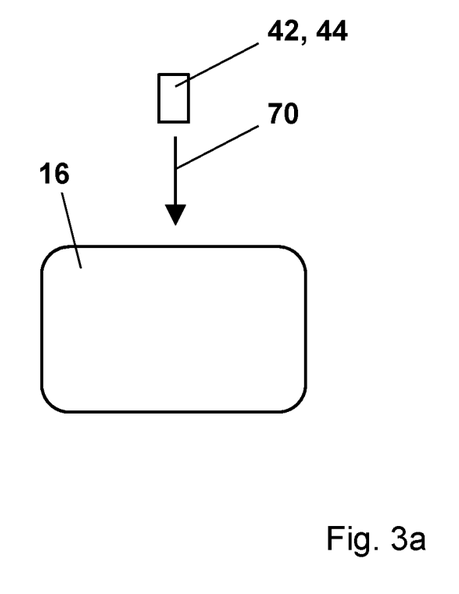
FIG. 3a is a schematic plan view showing an illustration of an ultrasonic sensor which is arranged perpendicularly with respect to a surface of a round bale without a first plastic film.

FIG. 3a shows a schematic illustration of the ultrasonic sensor 42, 44 which is arranged perpendicularly with respect to the surface of a round bale. The round baler 10 which is shown in FIGS. 1 and 2 can comprise the ultrasonic sensors 42, 44 which are shown in FIG. 3a, so that in the text which follows details are given only of the differences. The surface of the round bale 16 which is shown in FIG. 3a is not covered with the first plastic film 18. The ultrasonic sensor 42, 44 is arranged perpendicularly, in particular in the region of the detection angle, and is configured in such a way that the ultrasonic sensor 42, 44 emits an ultrasonic pulse 70 and receives an echo 72 of the ultrasonic pulse 70 if the first plastic film 18 is present on the surface of the round bale 16.

The surface normal and the ultrasonic sensor 42, 44, in particular the direction in which the ultrasonic sensor 42, 44 is oriented in order to determine the first plastic film 18, enclose the detection angle of 0 degrees. The ultrasonic wave or the ultrasonic pulse 70 which is emitted by the ultrasonic sensor 42, 44 is completely or partially absorbed by the round bale 16 in such a way that the ultrasonic sensor 42, 44 does not receive or detect an echo.

Figure 3B:
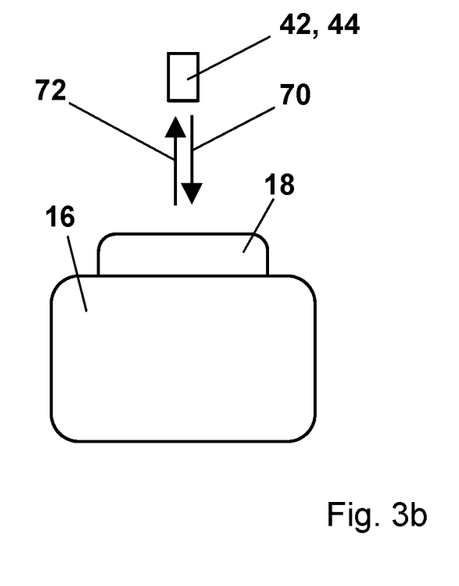
FIG. 3b is a schematic plan view showing an illustration of the ultrasonic sensor which is arranged perpendicularly with respect to the surface of the round bale with a first plastic film.

FIG. 3b shows a schematic illustration of the ultrasonic sensor 42, 44 which is arranged perpendicularly with respect to the surface of a round bale. The round baler 10 which is shown in FIGS. 1 and 2 can comprise the ultrasonic sensor 42, 44 which is shown in FIG. 3b and which also corresponds to the ultrasonic sensor shown in FIG. 3a, so that in the text which follows details are given only on the differences. The surface of the round bale 16 which is shown in FIG. 3b is covered with the first plastic film 18. The ultrasonic wave or the ultrasonic pulse 70 which is emitted by the ultrasonic sensor 42, 44 is partially or completely reflected by the first plastic film 18 on the surface of the round bale 16. Therefore, the ultrasonic sensor 42, 44 receives or detects an echo 72, that is to say a reflected ultrasonic wave 72.

Figure 4A:
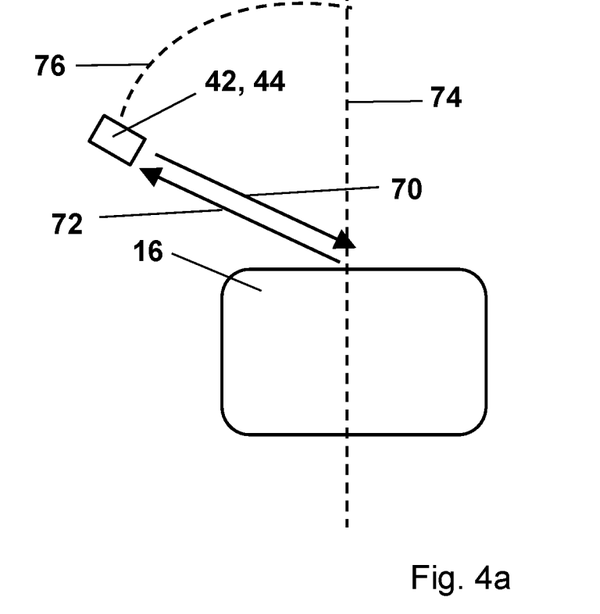
FIG. 4a is a schematic plan view showing an illustration of the ultrasonic sensor which encloses an orientation angle with the surface normal of the surface of the round bale, wherein a first plastic film is not arranged on the surface of the round bale.

FIG. 4a shows a schematic illustration of the ultrasonic sensor 42, 44 which is arranged and configured in such a way that the ultrasonic sensor 42, 44 encloses an orientation angle 76 with the surface normal 74 of the surface of the round bale 16 and does not receive an echo 72 of the ultrasonic pulse 70 if the first plastic film 18 is present on the surface of the round bale 16. The round baler 10 which is shown in FIGS. 1 and 2 can comprise the ultrasonic sensor 42, 44 which is shown in FIG. 4a, so that in the text which follows details are given only on the differences. The surface of the round bale 16 which is shown in FIG. 4a is not covered with the first plastic film 18. The surface normal 74 and the ultrasonic sensor 42, 44, in particular the direction in which the ultrasonic sensor 42, 44 is oriented in order to determine the first plastic film 18, enclose the orientation angle 76, in FIG. 4a an orientation angle of approximately 60 degrees. The ultrasonic wave 70 or the ultrasonic pulse 70 which is emitted by the ultrasonic sensor 42, 44 is partially or completely scattered and/or reflected by the round bale 16, in particular in the direction of the ultrasonic sensor 42, 44, to be precise in such a way that the ultrasonic sensor 42, 44 receives or detects an echo 72.

Figure 4B:
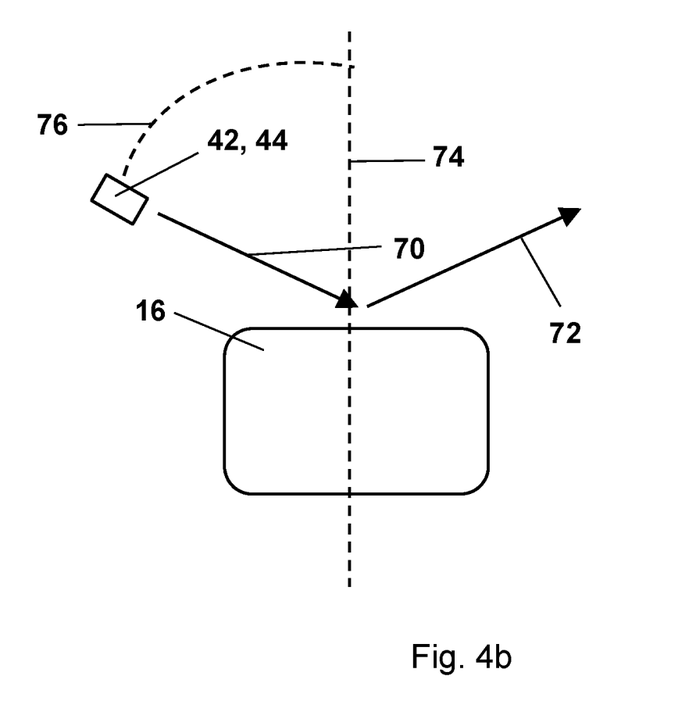
FIG. 4b is a schematic plan view showing an illustration of an ultrasonic sensor which encloses an orientation angle with the surface normal of the surface of the round bale, wherein a first plastic film is arranged on the round bale.

FIG. 4b shows a schematic illustration of the ultrasonic sensor 42, 44 which is arranged and configured in such a way that the ultrasonic sensor 42, 44 encloses an orientation angle 76 with the surface normal 74 of the surface of the round bale 16. The round baler 10 which is shown in FIGS. 1 and 2 can comprise the ultrasonic sensor 42, 44 which is shown in FIG. 4b and which corresponds to the ultrasonic sensor shown in FIG. 4a, so that in the text which follows details are given only on the differences. The surface of the round bale 16 which is shown in FIG. 4b is covered with the first plastic film 18. The surface normal and the ultrasonic sensor 42, 44, in particular the direction in which the ultrasonic sensor 42, 44 is oriented in order to determine the first plastic film 18, enclose the orientation angle 76 according to FIG. 4a. The ultrasonic wave 70 or the ultrasonic pulse 70 which is emitted by the ultrasonic sensor 42, 44 is partially or completely reflected by the first plastic film 18 on the surface of the round bale 16, in particular reflected away or scattered away from the ultrasonic sensor 42, 44. Therefore, the ultrasonic sensor 42, 44 does not receive or detect an echo 72, that is to say does not receive or detect a reflected ultrasonic wave 72.

Figure 5:
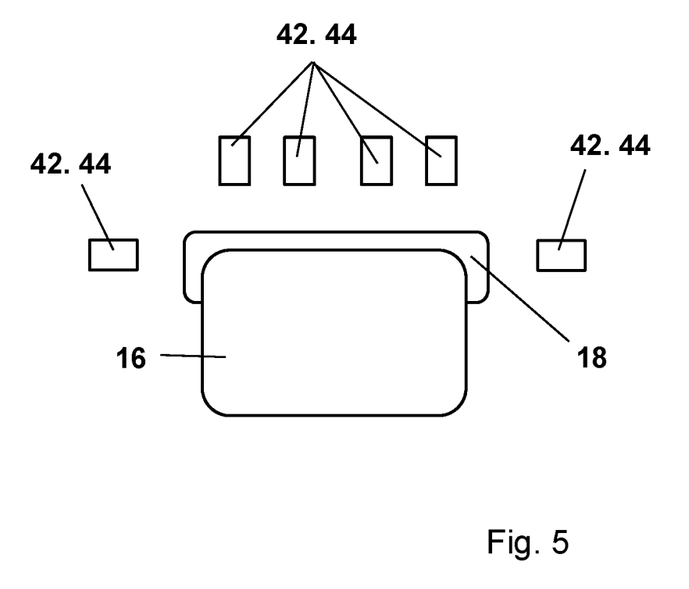
FIG. 5 is a schematic plan view showing an illustration of the arrangement possibilities of the ultrasonic sensor or sensors on the round baler according to the invention.

FIG. 5 shows a schematic illustration of the arrangement possibilities of the ultrasonic sensor or sensors 42, 44 on the round baler 10 according to the invention. The round baler 10 which is shown in FIGS. 1 and 2 can comprise the arrangement possibilities (shown in FIG. 5) of the ultrasonic sensors 42, 44. Furthermore, the ultrasonic sensors 42, 44 can have the modes shown in FIGS. 3a, 3b, 4a and 4b. For this reason, in the text which follows details are given only on the differences from the preceding figures. FIG. 5 shows six ultrasonic sensors 42, 44 which are arranged on or around a round bale 16, on the surface of which a first plastic film 18 is arranged. The ultrasonic sensors 42, 44 are arranged and oriented in such a way that they can transmit an ultrasonic wave 70 onto the round bale 16 or onto a first plastic film 18 which is arranged on the surface of the round bale 16 and/or can receive a reflected ultrasonic wave, the echo 72. Four of the ultrasonic sensors 42, 44 are arranged one next to the other in a row along the width of the bale chamber 12 and are oriented perpendicularly with respect to the surface. Two of the ultrasonic sensors 42, 44 are directed onto a side face of the round bale 16 in order to determine whether the side faces of the round bale 16 are covered with the first plastic film 18. However, the arrangement (shown in FIG. 5) of the ultrasonic sensors 42, 44 can also have only five or four or three or two or just one ultrasonic sensor 42, 44.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A round baler comprising:
    a bale chamber operable to form a pressed round bale;
    a wrapping device operable to wrap a first plastic film around the pressed round bale in the bale chamber;
    a feed device operable to feed the first plastic film into the bale chamber;
    a feed point at which the first plastic film is fed into the bale chamber;
    an ultrasonic sensor arranged at the bale chamber and operable to determine whether the first plastic film is present on a circumferential surface of the pressed round bale; and
    wherein the ultrasonic sensor is positioned to emit an ultrasonic pulse toward the pressed round bale at an orientation angle relative to the circumferential surface of the round bale, and does not receive an echo of the ultrasonic pulse if the first plastic film is present on the circumferential surface of the round bale.

2. The round baler according to claim 1, comprising a second bale wrapping device operable to wrap the pressed round bale with a second plastic film, wherein the second bale wrapping device adjoins the bale chamber along a longitudinal axis of the round baler.

3. The round baler according to claim 2, wherein the first plastic film has a smaller elasticity modulus than the second plastic film.

4. The round baler according to claim 1, wherein the ultrasonic sensor is arranged downstream of the feed point.

5. The round baler according to claim 1, wherein the ultrasonic sensor is arranged upstream of the feed point.

6. The round baler according to claim 1, wherein the ultrasonic sensor includes two or more ultrasonic sensors.

7. The round baler according to claim 1, wherein at least one of feeding of the first plastic film and rotation of the pressed round bale can be adjusted as a function of an output signal of the ultrasonic sensor.

8. The round baler according to claim 1, further comprising a control unit, wherein the ultrasonic sensor is connected in a signal-transmitting fashion to the control unit.

9. The round baler according to claim 8, wherein the control unit is operable to control the at least one of the baling chamber, the wrapping device, and the feed device, in response to a signal from the ultrasonic sensor.

10. The round baler according to claim 1, wherein the orientation angle is between ten degrees and eighty five degrees relative to normal of the circumferential surface of the pressed round bale.

11. A method of controlling a round baler, the method comprising:
    feeding a first plastic film into a bale chamber of the round baler through a feed point with a feed device;
    emitting an ultrasonic signal from an ultrasonic sensor toward a circumferential surface of a round bale disposed within the bale chamber, wherein the ultrasonic signal is directed toward the round bale at an orientation angle of between ten degrees and eighty five degrees relative to normal of the circumferential surface of the round bale;
    determining that the first plastic film is not disposed on the surface of the round bale, with a control unit, when an echo signal is sensed with the ultrasonic sensor, wherein the echo signal is generated by the ultrasonic signal reflecting off of the round bale;
    determining that the first plastic film is disposed on the surface of the round bale, with the control unit, when the echo signal is not sensed with the ultrasonic sensor; and
    controlling at least one of the bale chamber and the feed device to stop when the control unit determines that the first plastic film is not disposed on the surface of the round bale.

12. A round baler comprising:
    a bale chamber operable to form a pressed round bale;
    a wrapping device operable to wrap a first plastic film around the pressed round bale in the bale chamber;
    an ultrasonic sensor positioned to emit an ultrasonic pulse toward the pressed round bale at an orientation angle of between ten degrees and eighty five degrees relative to normal of a circumferential surface of the pressed round bale such that the ultrasonic sensor does not receive an echo of the ultrasonic pulse when the first plastic film is present on the circumferential surface of the pressed round bale.

* * * * *